(12) United States Patent
Asokan et al.

(10) Patent No.: US 8,532,304 B2
(45) Date of Patent: Sep. 10, 2013

(54) ADMINISTRATION OF WIRELESS LOCAL AREA NETWORKS

(75) Inventors: Nadarajah Asokan, Espoo (FI); Philip Ginzboorg, Espoo (FI); Seamus Moloney, Riihimäki (FI); Kari Ti. Kostiainen, Helsinki (FI); Sampo Sovio, Riihimäki (FI); Jan-Erik Ekberg, Vantaa (FI); Jari Takala, Vantaa (FI)

(73) Assignee: Nokia Corporation, Espoo (FI)

( * ) Notice: Subject to any disclaimer, the term of this patent is extended or adjusted under 35 U.S.C. 154(b) by 1089 days.

(21) Appl. No.: 11/169,328

(22) Filed: Jun. 29, 2005

(65) Prior Publication Data

US 2006/0251256 A1 Nov. 9, 2006

Related U.S. Application Data

(60) Provisional application No. 60/667,661, filed on Apr. 4, 2005, provisional application No. 60/673,806, filed on Apr. 22, 2005.

(51) Int. Cl.
*H04L 29/06* (2006.01)

(52) U.S. Cl.
USPC ............. 380/284; 380/281; 726/4; 726/29; 713/151; 713/153; 713/171

(58) Field of Classification Search
USPC ............. 713/2, 155, 154, 168, 150; 709/225, 709/226, 228, 229; 707/104.1, 12, 10, 104, 707/9
See application file for complete search history.

(56) References Cited

U.S. PATENT DOCUMENTS

| | | | | |
|---|---|---|---|---|
| 5,717,756 | A * | 2/1998 | Coleman | 713/155 |
| 6,473,758 | B1 * | 10/2002 | Schwartz et al. | 707/9 |
| 6,775,782 | B1 | 8/2004 | Buros et al. | |
| 6,865,673 | B1 * | 3/2005 | Nessett et al. | 713/155 |
| 6,944,774 | B2 * | 9/2005 | English et al. | 713/150 |
| 6,985,591 | B2 * | 1/2006 | Graunke | 380/277 |
| 6,993,134 | B1 * | 1/2006 | Epstein | 380/262 |

(Continued)

FOREIGN PATENT DOCUMENTS

| | | |
|---|---|---|
| EP | 1102430 | 5/2001 |
| EP | 1 536 306 A1 | 6/2005 |

(Continued)

OTHER PUBLICATIONS

PCT International Search Report (PCT/IB2006/000695 dated Sep. 5, 2006).

(Continued)

*Primary Examiner* — Michael R Vaughan
(74) *Attorney, Agent, or Firm* — Banner & Witcoff, Ltd.

(57) ABSTRACT

Methods and systems for managing access to a wireless local area network are provided. A wireless access point (AP) may use a unified approach that utilizes an out-of-band channel to communicate authentication key and network address information to a guest device, and utilizes an in-band channel to establish communications with the guest device, and also provides support for in-band setup on all devices. The ability to use out-of-band where possible provides for an increase to security and usability, and the possibility of delegating access from one device to another. The unified approach thereby also provides easy management of guest access to the WLAN.

48 Claims, 3 Drawing Sheets

(56) References Cited

U.S. PATENT DOCUMENTS

| | | | |
|---|---|---|---|
| 7,222,235 B1* | 5/2007 | Mitsui | 713/176 |
| 7,275,157 B2* | 9/2007 | Cam Winget | 713/168 |
| 7,277,548 B2* | 10/2007 | Park et al. | 380/270 |
| 7,346,772 B2* | 3/2008 | Rebo et al. | 713/155 |
| 7,436,965 B2* | 10/2008 | Sherman | 380/278 |
| 8,209,547 B2* | 6/2012 | Shimizu et al. | 713/193 |
| 2001/0027526 A1* | 10/2001 | English et al. | 713/201 |
| 2003/0021418 A1* | 1/2003 | Arakawa et al. | 380/277 |
| 2003/0093663 A1* | 5/2003 | Walker | 713/150 |
| 2004/0068668 A1 | 4/2004 | Lor et al. | |
| 2004/0098581 A1 | 5/2004 | Balfanz et al. | |
| 2004/0203590 A1* | 10/2004 | Shteyn | 455/410 |
| 2005/0025091 A1* | 2/2005 | Patel et al. | 370/328 |
| 2005/0063542 A1* | 3/2005 | Ryu | 380/259 |
| 2005/0076216 A1* | 4/2005 | Nyberg | 713/171 |
| 2005/0198291 A1* | 9/2005 | Hull et al. | 709/225 |
| 2006/0005033 A1* | 1/2006 | Wood | 713/182 |
| 2006/0053276 A1* | 3/2006 | Lortz et al. | 713/2 |
| 2006/0062391 A1* | 3/2006 | Lee et al. | 380/270 |
| 2006/0161771 A1* | 7/2006 | Zhang | 713/168 |
| 2007/0133803 A1* | 6/2007 | Saito et al. | 380/267 |
| 2009/0028262 A1* | 1/2009 | Imai et al. | 375/267 |
| 2010/0290625 A1* | 11/2010 | Dondeti | 380/278 |
| 2012/0185696 A1* | 7/2012 | Lortz et al. | 713/175 |

FOREIGN PATENT DOCUMENTS

| | | |
|---|---|---|
| JP | 2001202014 A | 7/2001 |
| JP | 2003018148 A | 1/2003 |
| JP | 2004355406 A | 12/2004 |
| KR | 20070116151 A | 12/2007 |
| WO | 2006106393 A2 | 10/2006 |

OTHER PUBLICATIONS

Glen Fleishman, "Broadcom Pushes Wi-Fi Security with a Single Button," WNN Wi-FI Net News, Jan. 5, 2005, 3 pages, printed from http://wifinetnews.com/archives/004635.html.

Broadcom, HP and Linksys Make Wi-Fi® Installation as Easy as Pusing a Button, International CES, Jan. 6, 2005, 3 pages, printed from http://www.broadcom.com/press/release.php?id=659800.

Adam Young, "Mitigating Insider Threats to RSA Key Generation," CryptoBytes, RSA Laboratories, vol. 7, No. 1, Spring 2004, pp. 1-15, printed from http://www.rsasecurity.com/rsalabs/cryptobytes/Spring_2004_Cryptobytes.pdf.

Naveen Sastry, et al., "Secure Verification of Location Claims," CryptoBytes, RSA Laboratories, vol. 7, No. 1, Spring 2004, pp. 16-28, printed from http://www.rsasecurity.com/rsalabs/cryptobytes/Spring_2004_Cryptobytes.pdf.

Christian Gehrmann, et al., "Manual Authentication for Wireless Devices," CryptoBytes, RSA Laboratories, vol. 7, No. 1, Spring 2004, pp. 29-37, printed from http://www.rsasecurity.com/rsalabs/cryptobytes/Spring_2004_Cryptobytes. pdf.

Korean Office Action dated Aug. 28, 2009 for Application No. 10-2007-7024516, 7 pages.

Substantive Examination Adverse Report from Intellectual Property Corporation of Malaysia for application No. PI 20071625, mailed Apr. 16, 2010, 8 pages.

Notification of the First Office Action for Chinese Application No. 200680014710.3, dated Jan. 29, 2009.

Non-Final Rejection for Korean Application No. 10-2007-7024516, mailed Feb. 26, 2010, 5 pages.

Vietnamese office action for application No. 1-2007-02230 mailed May 19, 2010, 4 pages.

Office action for Japanese patent application No. 2008-503609 mailed Nov. 15, 2010.

N. Asokan, et al. "Man-in-the-Middle in Tunnelled Authentication Protocols", Cryptology ePring Archive, Nov. 13, 2002, 15 pages.

Yasutomo Yamamoto, et al., "Recent Trends of Storage Systems Technologies", Mar. 1, 2005, 5 pages.

European office action for application No. 06744459.6 mailed May 10, 2012.

Results of substantive examination for Vietnamese patent application No. 1-2007-02230 mailed Apr. 6, 2012.

Notification of the Second Office Action mailed Mar. 30, 2011 in Chinese Application No. 200680014710.3 and English translation thereof.

Final Notice of Rejection for Japanese patent application 2008-503609 mailed Jun. 20, 2011.

First Examination Report for Indian Patent Application No. 4535/CHENP/2007 mailed Nov. 1, 2011.

Substantive Examination Adverse Report for Malaysian patent application No. PI 20071625 mailed Mar. 29, 2013.

* cited by examiner

FIG. 6

ADMINISTRATION OF WIRELESS LOCAL AREA NETWORKS

This application claims priority to provisional U.S. Application Ser. No. 60/667,661, filed Apr. 4, 2005, entitled "Easy, Flexible, and Secure Network Setup," and provisional U.S. Application Ser. No. 60/673,806, filed Apr. 22, 2005, entitled "Secure, Easy, and Flexible Network Setup," each of which is herein incorporated by reference.

FIELD OF THE INVENTION

The invention relates generally to computers and computer networks. More specifically, the invention provides systems and methods for the administration of wireless networks, such as a wireless local area network (WLAN).

BACKGROUND OF THE INVENTION

Setting up a home wireless network, such as a wireless local area network (WLAN), can be a very difficult process for most computer users, thus presenting a significant obstacle to efficient utilization of WLANs. One of the difficulties users encounter is determining how to best secure a WLAN. Wireless networks have typically been protected with a single Pre-Shared Key (PSK). However, the use of a single pre-shared secret key requires that a user re-configure the entire network if the user wants to deny future access to a device that was previously authorized for use on the WLAN. While the latest wireless LAN standard 802.11i (also known as "WPA2") supports the use of multiple PSKs, some access points (APs) do not support the use of multiple PSKs. The availability of multiple PSKs enables selective revocation of security associations, which makes removing guests possible. 802.11i specifies from the PSK onward, but it does not specify how PSKs are created. In addition, 802.11i does not specify how to group PSKs or how to remove a PSK when it is no longer needed.

Other 802.11X protocols specify how PMKs (Pairwise Master Keys, which are similar to PSKs, except that a PMK is valid only for a single session) are created using a separate protocol between a device and an authentication server on the network. However, like 802.11i, 802.11X also does not specify how to group PMKs (removal is implicit at the end of the session).

Figure 1:
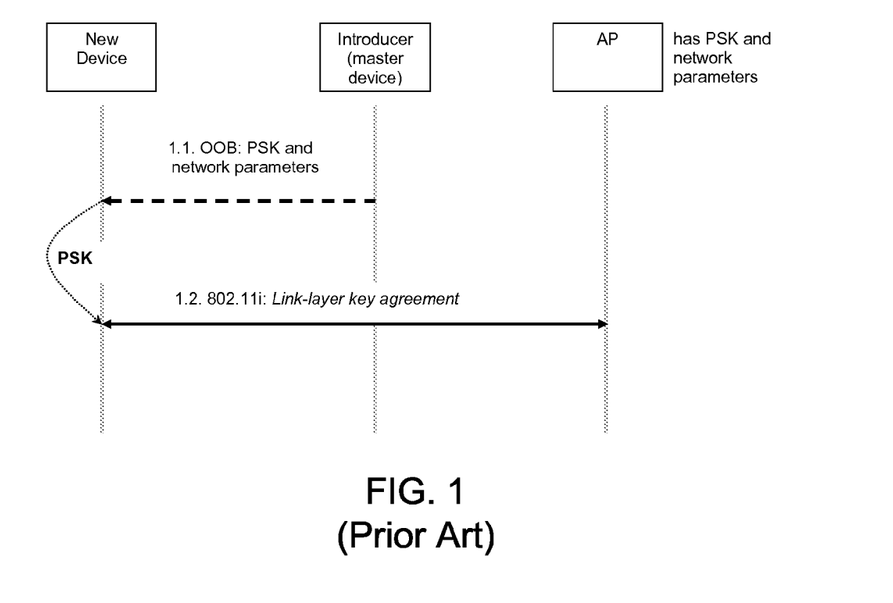
FIG. 1 illustrates a prior art out-of-band method.

Existing proposals for solving the network setup problem attempt to exploit proximity. For example, one known approach exploits physical proximity by using a physically secure "out-of-band" (OOB) channel 1.1. The OOB channel can be based on NFC (Near Field Communication), infrared, portable USB memory stick or any other communication technology that is based on physical proximity. The OOB is used to transfer the network identifier (e.g., a SSID) and a shared key from one device to another. Because the transferred key is used directly as the PSK, no additional protocols are needed. To add a new device to the network, the only user interaction needed is to touch the new device with a "token." The token can be a simple special-purpose device, or it can be part of another device, e.g., part of a WLAN client device that is already in the network. FIG. 1 illustrates this approach when an "introducer" is used to admit a new device into the network 1.2. Note that the introducer can be the AP itself. While this approach provides intuitive user interaction and allows delegation of access from one device to another, guest access remains cumbersome. Because the same PSK is used by all the devices, the only way to remove guest access is to remove all devices from the network, and then add allowed devices again, one by one.

Figure 2:
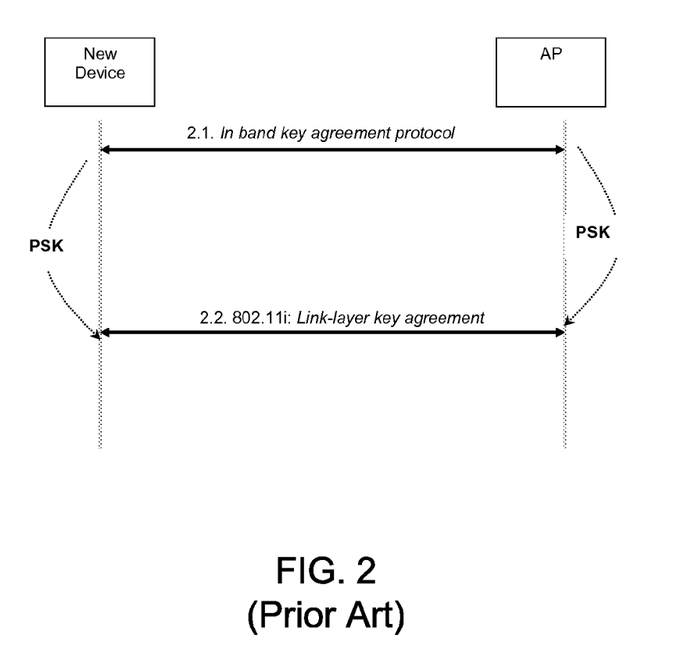
FIG. 2 illustrates a prior art in-band method.

Another known approach exploits time proximity using in-band configuration. A proposal by Broadcom for Secure Easy Setup (SES) falls into this category. In SES, network setup is performed by first putting the AP into a configuration mode, and then placing the new device into its configuration mode, e.g., by pressing a button on the respective devices. Once in configuration mode, the devices locate each other using some protocol to agree on a PSK. FIG. 2 illustrates an example of an "in-band" solution. Pairing of the new device and the AP in the in-band approach is done utilizing WLAN pairing methods 2.1 and 2.2. In-band solutions present a variety of problems, including the possibility of accidental pairing with an unintended device and the threat of a man-in-the-middle attack (because the initial key agreement protocol is not authenticated). In addition, guest access is cumbersome as in the OOB case, and no device-to-device delegation of access rights is possible.

The OOB and in-band approaches have advantages and disadvantages. The OOB approach is more intuitive and secure, but because of the extra hardware required, it is unreasonable to expect that all devices will have suitable out-of-band channels available. The in-band approach does not allow delegation of access and is less secure, but it is less expensive and is more likely to start appearing in commercial APs and client devices. Neither approach supports easy guest access management.

Thus, it would be an advancement in the art to provide methods and systems that allow for simpler and more efficient wireless network setup and administration that overcome the above limitations and disadvantages.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to methods and systems for managing access to a wireless local area network. A wireless access point (AP) or other access controller may use a unified approach that utilizes an out-of-band channel, or other first communication channel, to communicate authentication key and network address information to a guest device, and utilizes an in-band channel, or other second communication channel, to establish communications with the guest device, and also provides support for in-band setup on all devices. The ability to use out-of-band where possible provides for an increase to security and usability, and the possibility of delegating access from one device to another. The unified approach thereby also provides easy management of guest access to the WLAN.

According to a first aspect of the invention, a method may manage access to a wireless access point (AP) or other access controller by a mobile terminal, where the AP uses an out-of-band communication channel and an in-band communication channel. An authentication key (AK) corresponding to the mobile terminal is established, and then sent to the mobile terminal via the out-of-band channel. The AP receives a key agreement request from the mobile terminal via the in-band channel, and establishes an access key corresponding to the mobile terminal based on the received key agreement request, when the mobile terminal is authorized to access the AP. The AP authorizes the mobile terminal to communicate through the AP upon successful completion of the previous step. The AK is used to authenticate the key agreement.

According to another aspect of the invention, an alternative method manages access to a wireless access point (AP) or other access controller by a mobile terminal, where the AP uses an out-of-band communication channel and an in-band communication channel. An address of the AP is sent to a master device. A guest authentication key (AK) corresponding to the mobile terminal is generated, and corresponding information is sent to the mobile terminal from the master device. The mobile terminal sends a second AK to the AP, which compares the guest AK with the second AK. The AP grants access to the mobile terminal when the second AK matches the guest AK.

According to another aspect of the invention, a new mobile terminal may be adapted to communication with the network. The mobile terminal may include a processor controlling overall operation of the mobile terminal, a first transceiver for sending and receiving communications over a first communication channel in-band with a wireless access point (AP) or other access controller, and a receiver for receiving communications over a second communication channel out-of-band with the wireless access point (AP). The mobile terminal may also include memory storing computer executable instructions that, when executed by the processor, cause the mobile terminal to perform a method for accessing a wireless local area network. The method may performs steps receiving a guest authentication key (AK) and an address of the wireless AP via the second communication channel, and sending the guest AK to the AP via the first communication channel to establish communications with the AP.

Those of skill in the art will appreciate that the above is merely an introduction to the subject matter described in more detail below.

BRIEF DESCRIPTION OF THE DRAWINGS

A more complete understanding of the present invention and certain advantages thereof may be acquired by referring to the following description in consideration of the accompanying drawings, in which like reference numbers indicate like features, and wherein.

DETAILED DESCRIPTION OF THE INVENTION

In the following description of the various illustrative embodiments, reference is made to the accompanying drawings, which form a part hereof, and in which are shown by way of illustration various example embodiments in which the invention may be practiced. It is to be understood that other embodiments may be utilized and structural and functional modifications may be made without departing from the scope of the present invention.

Figure 3:
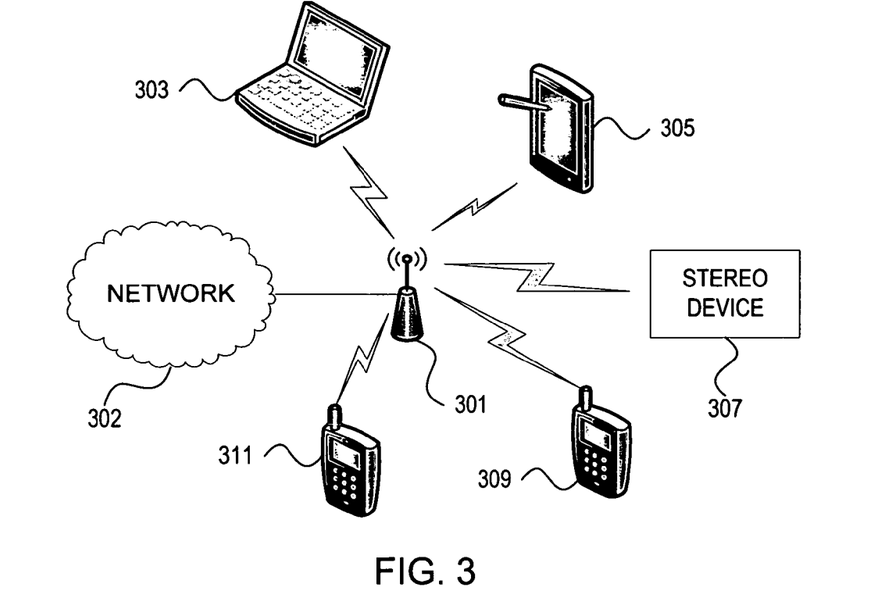
FIG. 3 illustrates a network architecture that may be used according to one or more illustrative aspects of the invention.

One or more aspects of the invention may be used in the following illustrative scenario. With reference to FIG. 3, in one embodiment of the invention, a user purchases a new high speed wireless LAN access point 301 (or other access controller) and brings the device to his or her home. The user wishes to easily connect other wireless devices 303, 305, 307, 309 or 311 in the home to the new access point 301 so that these devices also can use the wireless network 302. Wireless devices are generically referred to herein as mobile terminals, and may include, but are not limited to, any device with wireless communications capabilities, such as mobile phones, smart phones, home appliances, laptop computers, desktop computers, personal digital assistants, audio/video devices, televisions, set-top boxes, personal video recorders, personal digital recorders, digital camera, digital camcorder, personal memory device, home automation and/or control devices, sensors, vehicles, and the like or any combination of them.

After plugging in the access point 301, the user connects his or her WLAN enabled mobile phone 309 to the new access point 301 by simply pressing a button on both devices (not shown). The AP 301 may then be placed on a shelf or other appropriate location, e.g., where it is out of reach of children or other sources of damage or harm. To connect one of the other wireless home devices to the network 302, such as the home stereo 307, the user can either "touch" those devices with the mobile phone 309 or (for at least some devices) press a configuration button on both the device 307 and the AP 301 to get them to join the network 302. Later, if the user's neighbor comes over, the user may like to show off the advanced network 302 she has built and allow the neighbor to use her own phone 311 to stream some music to the home stereo 307. This may be accomplished, e.g., by "touching" the neighbor's phone 311 with the user's phone 309. When the neighbor has seen enough and returns to her house, the user presses a button (not shown) on the access point 301 to end the temporary visitor permission that was granted to the neighbor, so the neighbor can no longer control the devices in the user's home. Alternatively, the user may use her phone 309 to end the temporary visitor permission.

The above scenario is illustrative for purposes of describing aspects of the invention and is not limiting in any way. As used herein, "touching" refers to a proximity based interaction between two devices wherein setup and/or security information is transferred or granted from one device to the other. In one example, "touching" refers to moving the devices physically close to each other so that the OOB channel (NFC, short range wireless communication, infrared, Bluetooth, UWB, WiFi, RFID, USB memory stick, etc.) can be established and needed data exchanged over the OOB channel. According to an aspect of the invention, a unified approach may be used that utilizes aspects of both the OOB and in-band approaches, thereby allowing support for the in-band approach on all devices, but also the ability to use out-of-band where possible to increase security and usability, and the possibility of delegating access from one device to another. The unified approach thereby also provides easy management of guest access to the WLAN.

Figure 4:
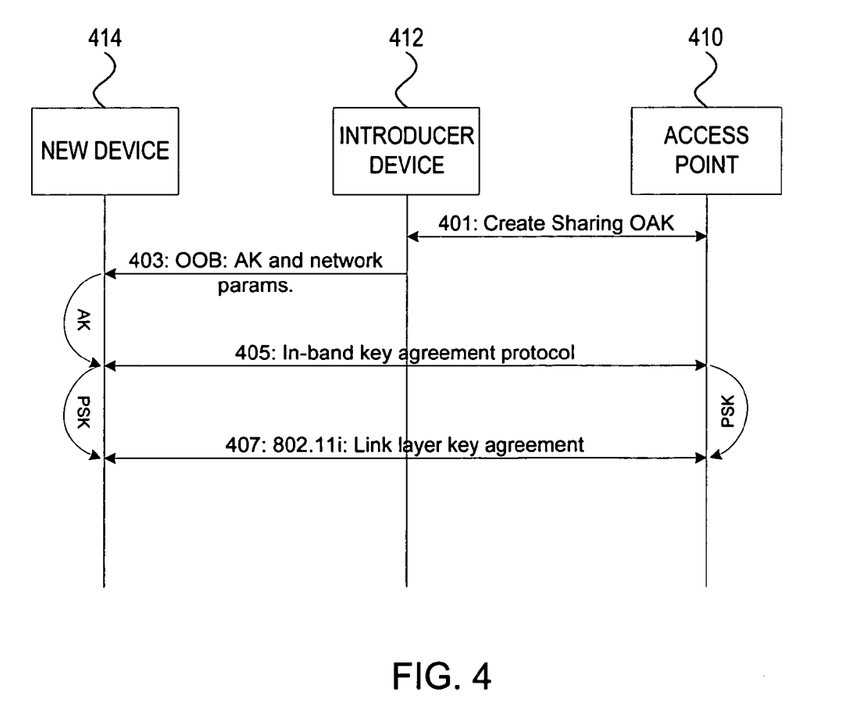
FIG. 4 illustrates a unified out-of-band/in-band method according to one or more illustrative aspects of the invention.

FIG. 4 illustrates an illustrative embodiment of the invention and one possible way to achieve this unification. In step 401, Access Point 410 and Introducer Device 412 create and share an original authentication key (OAK). AP 410 and device 412 may optionally be portions of the same device. In step 403, introducer device 412 provides to a new device 414 via an out of band channel, the AK (where AK=f(OAK, AK-ID), as further described herein) and applicable network parameters (e.g., address of the AP, SSID). Using the AK, in step 405 the new device 414 and the access point 410 use a key agreement protocol to create a key for the new device. Finally, in step 407, the new device 414 and the AP 410 perform link layer key agreement procedures, e.g., using 802.11i.

As illustrated in FIG. 4, the PSK may be derived from an in-band key agreement protocol. However, if an out-of-band channel is available, the OOB channel can be used to transfer the authentication key (AK) and the address of the AP 410 to the new device 414, which triggers the in-band key agreement (i.e., the user does not have to press any buttons). The "out-of-band" channel is not limited to NFC, but it can be any means of passing the AK (and the network parameters, where feasible) to the New Device. The out-of-band channel may consist of a Personal Identification Number (PIN) typed by the user.

The AP 410 may have two types of "receiving modes." In the first, "authenticated," receiving mode, the AP 410 accepts requests for authenticated key agreements. The AK may be used to authenticate the key agreement, by default. By pressing a button on the AP 410, the AP 410 can be put into a second, "unauthenticated," receiving mode for a short time. Behavior in this mode may be similar as in the Broadcom approach, described above. The authentication of key agreement prevents accidental pairing and the possibility of "man-in-the-middle" type attacks. Also, there can be multiple authentication keys (e.g., owner AK, family AK, guest AK, etc.). For example, an AP may have three "tokens" each containing a different authentication key. The AP 410 may categorize security associations based on how they were authenticated. In this case, a "remove all guests" operation (e.g., a long button press) makes the AP 410 remove all security associations made using the guest authentication key or no authentication key. Any security associations made using other authentication keys, however, might not be removed by this operation. This allows effective and intuitive guest access management.

Each device may have a dedicated PSK, thereby enabling selective revocation of security associations. The PSK is long-lived and is derived from the run of the protocol and the value of the AK used. In this example, PSKs can be labeled and stored at the AP with the name of the owner AK used, thus allowing for knowledge of which family member issued access to which guest.

Delegation may be accomplished with user interaction similar to the above OOB solution. Multiple forms of "AP addresses" can be included in "network parameters." For example, if the AP's DNS name is included, the AP can be used for remote access to the home.

The AP need not have an out-of-band interface, because the initial AK keys and network parameters can be delivered in the form of passive tokens. However, if the AP has an out-of-band interface, the AP can use that interface to emit the initial AK keys (owner AK) and network parameters in some limited fashion (e.g., once after purchase or full reset). The AP can use the out-of-band interface to receive initial AK keys and network parameters from the outside (e.g., once after purchase or full reset). The following Table 1 summarizes different possibilities for generation and delivery of AKs and network parameters that may be used in accordance with examples of this invention.

TABLE 1

Authentication Key Generation and Delivery

| PARAMETER GENERATION | DELIVERY MECHANISM | OUT-OF-BAND CHANNEL ON AP |
|---|---|---|
| AP generates AKs and network parameters | Delivered separately (e.g., passive NFC tokens, PIN codes printed on package). | Not needed |
| | Emitted via out-of-band channel for a limited time after full reset or purchase. | Needed |
| | Emitted via in-band channel for a limited time after full reset or purchase. (Less secure, but could be used to avoid extra hardware costs.) | Not needed |
| AP receives AKs and network parameters from an external device (e.g., phone) | Received via out-of-band channel for a limited time after full reset or purchase. | Needed |
| | Received via in-band channel for a limited time after full reset or purchase. (Less secure, but could be used to avoid extra hardware costs.) | Not needed |

As mentioned above, the out-of-band channel is not limited to NFC. Additional examples of OOB channels include: SMS (Short Message Service), MMS (multimedia messaging service), or similar telecommunications messaging services. Using SMS, a user may pick a contact from an address book, select what type of access to grant, and then send an SMS to the contact with the AP address and AK. The device receiving the SMS may then perform steps 405 and 407 shown in FIG. 4. This combined approach preserves advantages of both approaches, and it enables easy guest access management.

Revocation: In the simplest case, there is only one AK, and that AK may be used for delegating owner access. Guests can be admitted using an unauthenticated pairing, as in the basic Broadcom approach described above. The difference is that when an owner wants to remove guest access, the entire network need not be recreated. Rather, just the PSKs that were created without any authentication are removed.

When guest access is granted using a guest AK, then when this guest access is to be revoked, the AP removes or marks invalid the PSK that was used by the guest during his or her access period. As mentioned above, this action may be initiated or achieved by pressing a button on the access point or other access controller for a predetermined amount of time, which would revoke all guest access to the network. More fine-grained approaches also are possible without departing from this invention, but from an end-user usability perspective, such a one-button approach has certain advantages and appeal. Alternatively, removing or marking the PSK as invalid may be initiated or achieved by using the user/introducer device 412, e.g., by transmitting a request for revocation to the AP or by browsing a table of authenticated users/user devices.

Even after revocation, guests will still hold the valid AK, and thus the possibility to obtain a new PSK using an authenticated SES request. In order to prevent this, the AK used by guests is preferably changed as part of the reset guest access procedure. Thus, along with removing the guest PSKS, the AP preferably determines a new AK for accepting authenticated SES requests. In addition, after this type of AK reset, the existing owner devices are made capable of once again granting access to guests.

In general, the AK is determined by AK=f(OAK, AK-ID), wherein AK-ID may be any parameter or subfunction of multiple parameters. Three ways of allowing owner devices to grant access to guests include, e.g., timestamp, sequence number, and download procedures, as discussed further below. AK-ID may represent any single parameter or any combination of parameters based on some predefined function. Other parameters that may be incorporated into the calculation of AK-ID include, e.g., category type, MAC address and user device name or ID. Those of skill in the art will appreciate that other parameters may also or alternatively be used in any combination. AK-ID may be thought of as a data structure or computation that encodes various information in some predetermined manner.

An AK can therefore be derived from an OAK shared between the introducing device and the AP, and one or more other variables storing additional information unique to the new device, and the address of the AP as provided by the introducing device to the new device. The one or more other variables may be transferred by the new device as part of the key agreement protocol such that the AP can derive the same AK. The AK may then be used to authenticate the key agreement protocol, as the AK is not itself transferred. Other illustrative approaches are described below.

Timestamp: in this approach, the guest AK used is a function of time. Each group (e.g., family, guests, etc.) has an "original AK" (OAK). The OAK is not given out during delegation. Instead, a transient AK may be derived from the OAK, for example, AK=f(OAK, time), where OAK is as mentioned above and time could be any time based value, e.g., milliseconds since 1.1.1970 (standard Unix). Both the AP and the delegating owner devices/master devices can calculate the same AK using this function, and the guest device receives the AK and presents it to the AP along with the AK identifier which includes "time." The access point might accept authenticated SES requests only when an AK is used that it recognizes. Derived AKs will thus have limited lifetimes, e.g., one day. This implies that the guests only have one day in which to issue the authenticated SES requests. After that the access point will no longer accept that AK. A potential disadvantage with this approach is that differences in clock synchronization between the AP and the delegating devices (which might be such that the device time is set by the user) may cause inconsistencies.

Sequence number: This approach involves using sequence numbers rather than timestamps in order to avoid the clock synchronization problems mentioned above. OAK is as before, and AK=f(OAK, sequence number). The AP maintains a sliding window of acceptable sequence numbers. The AP updates the window whenever it receives a new sequence number. Because sequence numbers have a short life time, old unused sequence numbers will automatically expire. The result is that an AK can only be used for a short period of time.

Download: in this approach the AP generates a new guest AK when the guest access is to be reset and the individual owner devices then obtain the new guest AK from the AP using either an in-band or out-of-band method. In such a scenario, the owner devices have knowledge of the owner AK in order to allow them to unpackage the new guest AK. This method has the disadvantage that it requires action on the part of the end users (or devices) in order to obtain the new AK.

Figure 5:
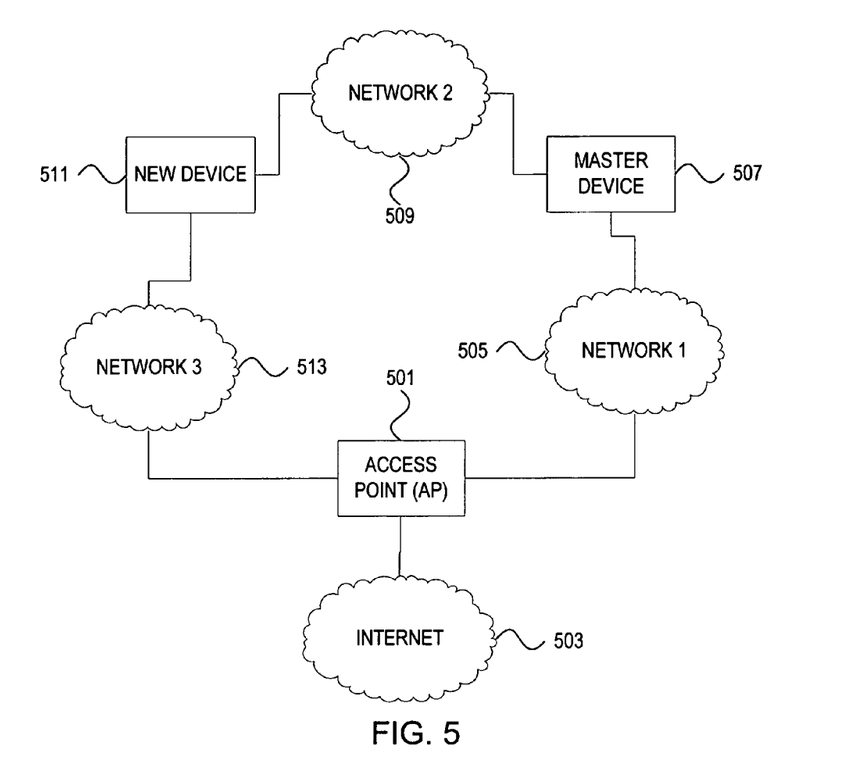
FIG. 5 illustrates a network architecture that may be used according to one or more illustrative aspects of the invention.

The invention may be practiced in any suitable network environment, and it is not limited to any specific network architecture. FIG. 5 presents another sample network operating environment in which one or more illustrative aspects of the invention may be practiced. Access point 501 incorporates a WLAN access point as well as access to WLAN Server(s) and other networks such as the internet 503. First Network 505 may include a WLAN network or NFC, such as RFID. Master device 507 may include a mobile communication device or remote control device having access to first and second networks 505 and 509. Second network 509 may include an out-of-band channel such as NFC or RFID. Second network 509 may alternatively include WLAN, short range radio (e.g., Bluetooth), wireless telecom (SMS, MMS), IrDA, and the like. New Device 511 may include a mobile communication device, remote control device, peripheral devices, consumer electronic devices, or other device having access to second and third networks 509, 513. Third network 513 may include an in-band channel such as the WLAN network or an out-of-band channel as NFC or RFID.

In the architecture of FIG. 5, where one of the devices has a display, e.g., a mobile phone, when the user "touches" the home appliance (e.g., a stereo), the mobile telephone may display a picture of the appliance transmitted from the appliance on the phone display. The user, by pushing a button, can change the network parameters for only the appliance shown in the display, thus giving users a better understanding of which appliances to pair. In the WLAN case, the pairing is between a device and the access point (and not between devices), but the idea need not be limited to the WLAN case. In this case, an image of the device may be displayed on a display of the AP, or alternatively, an image of the AP may be displayed on a display of the device. The picture may be transmitted in step 403 or before step 403. The picture may be delivered via NFC or any other communication network. This function requires significant memory space, and it could turn the "touch" into a "hold" meaning that the touching takes a longer time. Alternative to displaying a picture, the mobile phone may display a device name, similar to Bluetooth devices, preferably with more description, e.g., "Philips TV set," "France Telecom WLAN access point," "Sony HiFi stereo," "Nokia 6600," "Sam's PDA," etc.

Some devices, however, may have the same pseudo-unique name, thus the connection may be to/from another device than was intended. Typically the mistake will be detected immediately, but only after at least one transmission has been taken place, and the data was transmitted to wrong device and the intended receiver did not receive anything. When a wireless connection between two cellular phones is desired, the proof of other party's identity may be obtained from the cellular network. One cell phone or mobile terminal may call the other (without the other end answering the call—meaning it is free of charge) to verify the device. That is, to call the other device the caller needs to know the number of the called party. In addition, the called party is able to verify the moment when it is being called (e.g., based on caller ID). Thus the proof of the identity of the devices is not obviously visible to external parties.

In one embodiment of the invention, proving the identity with a (unanswered) call may be performed as follows: the device to be authenticated (device A) sends its phone number over a wireless connection (such as Bluetooth or WLAN) to the device that wishes to authenticate itself (device B). An authentication application in device B waits for some predetermined or randomly chosen time and dials device A via a wireless telecom network. When device A detects the call, it immediately informs device B about the call via a wireless connection (such as Bluetooth, WLAN). An authentication application in device B may now decide if the response from A came fast enough to the call it made (during some predetermined period of time), thereby causing B to approve A's identity (i.e., the phone number it sent). Alternatively or additionally, the identity of device A (phone number and name from address book of device B, or phone number is just transmitted) may be displayed to the user making the connection on a display of device B and be asked the what permission should be granted for the connection. This technique works even if the network does not transmit the phone number of device A (e.g., if the phone number is secret or the user is roaming in such a network that the number is not transmitted). Mutual authentication may be based on the phone number of device A (if the network provides it) or on another call from the opposite direction. This method may be useful, e.g., in step 403 in FIG. 4.

An alternative embodiment of the invention, proving the identity with a (unanswered) call may be performed as follows: the device to be authenticated (device A) sends its phone number over a wireless telecommunication connection to the device that wishes to authenticate itself (device B), i.e., device A calls device B. An authentication application in device B stores the phone number of device A in an access database and waits for some predetermined or randomly chosen time and dials device A via a wireless telecom network. When device A detects the call, it immediately informs device B about the call via a wireless connection (such as Bluetooth or WLAN) including the phone number of device B and its own phone number. A's phone number may optionally be used to computer the key used to protect the wireless connection. An authentication application in device B may check now if the phone number of device A is in the access database, if the response from A came fast enough to the call it made (during some predetermined period of time), thereby causing B to approve A's identity (i.e., the phone number it sent). This method is useful, e.g., in step 403 in FIG. 4.

Further, in one embodiment of the invention, when device A informs device B about the call via a Bluetooth connection this information may now include the phone number of the device B, the phone number of device A and also Bluetooth identification information. A's phone number may optionally be used to computer the key used to protect the wireless connection. An authentication application in device B may check if the phone number and the Bluetooth identification information of device A are in the access database, if the response from device A came fast enough to the call it made (during some predetermined period of time), thereby causing device B to approve device A's identity (i.e., the phone number it sent). Authentication may also be done by checking a pair A (phone number, Bluetooth identification information) in the access database. This method may be useful, e.g., in step 403 in FIG. 4.

The immediately above described method may be used, e.g., in the following example situations:

1) A WLAN access point device (device B) and a new device (device A) have wireless telecom capabilities. This wireless telecom access is used to share information needed for establishing WLAN access between the devices, like in step 403 in FIG. 4. In this case the devices may initialize WLAN access set-up automatically after sharing needed information. Alternatively, the set-up of WLAN access may be manually initiated by the user.

2) Mr. Marty Manager sits in a meeting with his customers and realizes that he does not have the latest presentation of his product stored on his smartphone. He sends a SMS message to his secretary and asks her to send it via ad-hoc WLAN to his phone. His secretary launches an ad-hoc application on her the phone, which initiates the ad-hoc connection by sending her phone number to Marty's phone, thus initiating the connection. Marty accepts the connection from his secretary (it is shown based on the number the call was made to—or was intended to be made to, depending on the security level settings). When the connection is up, the file may be sent to Marty's smartphone.

3) When a device A wishes to make a connection to device B, it creates a wireless connection to device B and the devices exchange their telephone numbers over the connection. The UI on the phones/devices show the user name of the calling device (if it is on the phone's phonebook) or minimally, the phone number. The UI then asks the user if the connection may be established and authenticated. During the authentication phase the devices make a phone call to the other device, thus proving with the call that the device is who it claims to be.

The above method can be used between devices that are not physically visible to each other, it is enough that they are within the reach of wireless connectivity. The connection establishing process is simple to the user, especially if the responder's phone number can be browsed from the phonebook (from the user's point of view making the connection is as easy as making a call).

According to an aspect of the invention, network access may be based on the AK and the MAC address of a device. To allow network access to the new device, a delegating device may give the AK to the new device out of band, but the delegating device does not communicate with the AP, nor is there a special key agreement protocol between the new device and the AP. When the new device contacts the AP, the AP and the new device independently derive a new PSK from the AK and the MAC address of the device. For instance, PSK=f(AK, MAC address), where f is a suitable key derivation function. To revoke network access from the device, the owner may use the AP's management interface to mark the target device as "revoked." Thereafter, the PSK of that device is removed and the AP may add the MAC address of the device to a list of revoked devices. A device whose MAC address is on that list will not be able to establish a PSK with the AP, i.e., it will not be able to do Step (1) above, unless access has been re-granted to the device.

One advantage of this approach is that the new device and the AP can derive the PSK independently, without new key agreement protocol messages. Knowledge of AK and the device's MAC address is enough. A disadvantage of this approach, however, is that the AP must keep track of revoked MAC addresses. Also, this approach is less secure than deriving the PSK from the AK using a key agreement protocol, because MAC addresses can be forged. Finally, allowing a previously revoked device back into the network requires the delegator to interact with the AP to remove its MAC address from the list of revoked devices, thereby requiring knowledge of an additional protocol.

According to another aspect of the invention an authenticated devices database may be used (see table 2). The AP may contain an authenticated devices database, e.g., a table, storing (1) the MAC address of each device that is part of the WLAN network and (2) a key, PSK, that the AP shares with the device: {MAC address, PSK}. When a device contacts the AP, the AP searches the MAC address of the contacting device from that table and uses the associated PSK in communicating with that device if the MAC address is found. If the MAC address is not found, the AP may, e.g., refuse to communicate with the device, send a predetermined message to the device, or use some other procedure defined for unauthenticated devices. The authenticated devices database may further include a device group (DG) record: {MAC address, PSK, DG}. The DG field may include, for example, at least a type and AK: e.g., DG={Type, AK}. Type may identify a device, e.g., as "unauthenticated," in which case the AK field would be empty. As another example, the Type value could be "Guest," in which case the AK would be that reserved for guests. As a third example, the Type value could be "Home," in which case the AK will be that reserved for the home devices, such as consumer electronics devices or domestic appliances. Other Type values may include "Sensor" describing different sensors connected to the AP. The specific number of different types is not limited. The DG record of a device is initialized based on the value of the AK that the device knows, e.g., when that device joins the network. Additionally, the database may have a column describing who has given the access rights. Additionally, the device group may include a column for Original AK (OAK). Table 2 shows an example of information that may be included in an authenticated devices database. Other Type values may alternatively be used depending on system needs, e.g., an expiration date associated with a database entry to ensure automatic cancellation of user rights (otherwise revocation may occur when the user is removed from the database or when the expiration time is cancelled or changed). An example of an authenticated devices database is shown below in Table 2.

TABLE 2

Authenticated devices database

| Given by (Authenticator) | Device group (DG) | | | | | |
|---|---|---|---|---|---|---|
| | Type | AK | OAK | MAC | PSK | Device name |
| Master device | Unauthenticated | — | — | MAC1 | PSK1 | Stereo 1 |
| Master device | Sensor | AK2 | OAK3 | MAC2 | PSK2 | Temperature, bed room 1 |
| Master device | Home | AK9 | OAK1 | MAC9 | PSK9 | TV 1 |
| Mother | Guest | AK3 | OAK2 | MAC3 | PSK3 | Bob's phone |
| Jack | Guest | AK4 | OAK2 | MAC4 | PSK4 | Pete's game device |
| Jack | Guest | AK5 | OAK2 | MAC5 | PSK5 | Pate's music player |
| Jane | Unauthenticated | — | — | MAC6 | PSK6 | NN |
| Dad | Sensor | AK7 | OAK3 | MAC7 | PSK7 | Humidity bed room 1 |
| Dad | Guest | AK8 | OAK2 | MAC8 | PSK8 | Mary's camera |

As described above, when a device contacts the AP, the AP will search the MAC address of the contacting device from the authenticated devices database and use the associated PSK in communicating with that device if the MAC address is found. The existence of the DG record allows the AP to manage different groups of devices. For instance, without the DG field, the revocation of network access of a guest device requires the owner to know the MAC address or the PSK of that device. If he does not know those, then he must find them out (e.g., by examining the MAC addresses of all his home devices), or he must change the PSK values of all his devices, i.e., he must scan or rekey the whole network to revoke the guest device.

In contrast, consider the same operation when the DG record is present in the AP table. When the owner instructs the AP to revoke access to all guest devices, the AP point simply removes all records whose DG "Type" field equals "Guest." Additionally, information on who has given the access rights may be used to make intelligent decisions. In an additional example, a master device may wirelessly access and manage the authenticated devices database. Alternatively, the authenticated devices database may be accessed by a personal computer in a WLAN home network. A revocation of a user may happen by removing the user from the list or canceling or changing the user device's expiry date/time. Alternatively, the table may also include expiry dates for user devices. This ensures automatic cancellation of user rights. Alternatively, the user can use the "device name" field to identify the devices whose access should be revoked.

According to an aspect of the invention, the information transferred using the out of band channel may include a derived PSK, a random passphrase, or one or more<AK type, AK version, AK value>pairs. "AK type" may be a fixed size integer, optionally with some reserved values (e.g., 0=visitor, 1=owner). AK version is a number and its contents depend on the scheme used for revocation. If sequence numbers are used as the basis of revocation, AK version may contain<ownerID+sequenceNumberOwnerUsedWhen-IssuingAK>. If a time based approach is used, the AK version may contain<ownerID|timestamp of when the AK was issued>. If revocation of guests leads to a new guest AK being created at the AP and owners needing to download this new AK, there is no information needed in this field.

As discussed above, Broadcom has proposed SES. The Broadcom proposal may be modified according to one or more aspects of the invention, where the key agreement protocol preferably supports optional authentication. Authentication preferably uses an AK, and the protocol messages preferably are changed to identify the AK type. (If the latter is not possible, only two groups can be supported: authenticated=owner, unauthenticated=guest.) When the resulting PSK is stored, the AK type is also stored. Two types of reset may be used, one to remove all guest security associations (e.g., long button press) and a second to completely reset the system. Also, the the AP may be permanently in a mode where it can accept authenticated requests for PSKS, i.e., there is no requirement for button presses in order to reach this mode.

The SecureEasySetup (SES) as described above and, for example, at www.broadcom.com/press/release.ph-p?id=659800, is a simple protocol for configuring secure WLAN connections proposed by Broadcom. The SES protocol assumes that both the client device and the access point (AP) have a button (the button can be a software or harware button or switch, e.g., on/off switch). In order to add a new client device to the WLAN network, the user first presses a button on the AP and then on the client device. The result of these two button presses is that the client receives a WPA ("WiFi Protected Access") key and an SSID ("Service Set Identifier") from the AP. Aspects of the present invention further improve on the systems and methods described above. For example, as will be described below, aspects of the present invention make network access more secure and user accessible in situations outside of an individual user's home. As even more specific examples, suitable systems and methods may be provided to allow visitors, for example, in hotels, restaurants, and the like, to securely, temporarily, and easily access the network system.

When enabling visitor access to networks, hotels, restaurants, and other public access places may not wish to remove all visitor accounts at any given time (rather, network guests or visitors may enter and leave the network at many different times). Accordingly, in accordance with at least some examples of the invention, as described in more detail below, expiration information may be added to an authentication key ID and/or expiration information may be provided via calculation of an authentication key. In some examples, if the expiration information=0, this may be used to indicate that the AK does not expire automatically.

Before clients can be added into a WLAN network, the AP needs to generate a WPA key and an SSID. A WPA key is the specification by WiFi Alliance based on a version of 802.11i. It is intended to be a stopgap measure until 802.11i is ready. WPA-2 is intended to be 802.11i. 802.11i is an official IEEE standard for security of Wireless LANs. In systems and methods in accordance with at least some examples of this invention, the WPA key is a pre-shared key between the WLAN client and an access point (also called a "PSK" herein). An SSID is a unique identifier for a WLAN network. Access points (APs) broadcast the SSID.

In at least some examples of this invention, a client may be added to a WLAN network by pressing a button provided on the AP for an extended time period (e.g., five seconds). While the AP generates the WPA key and the SSID, it will flash LED lights or give some other indication to the user. If the AP had any existing pairings, they will be removed during this process. Once a new network is generated, users can add new devices to the network by pressing a single button on the AP and the client device.

Figure 6:
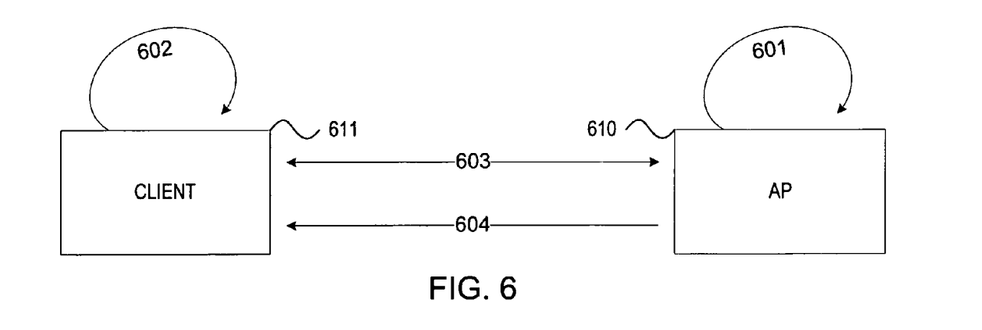
FIG. 6 illustrates a method according to an SES protocol.

FIG. 6 illustrates the protocol of adding new clients into a network using the SES protocol. In step 601, a button press on the AP 610 causes the AP to go into reception mode for some period of time, e.g., two minutes. That is, the AP waits in a state for that time where it is available to establish secure tunnel communication with a client device. In step 602, a button press on client device 611 initiates a search by the client to locate an AP, e.g., AP 610, which is in reception mode. After the client 611 has found AP 610, the client 611 establishes a secure tunnel with AP 610 in step 603. If the AP had already created a secure tunnel with another client, it will not start to secure a tunnel establishment, but instead it replies with a warning or error message. In step 604 the client 611 receives a protocol message for continuing secure tunnel establishment. The protocol message may include the WPA key and SSID.

The SES protocol of FIG. 6 is user-friendly and somewhat secure. However, it still has a few drawbacks, including that client pairing with an unintended AP is possible, AP pairing with an unintended client is possible, man-in-the-middle attacks are possible, and all the pairings are permanent. It is not possible to give temporary access, for example, to visitors. Some of these vulnerabilities assume that there is another, possibly malicious AP or client present and in reception mode (these are denoted as "AP_OTHER" and "CLIENT_OTHER" in the description below). The AP that the user wants to pair with her client is designated as "AP_OK" and her client is designated as "CLIENT_OK" in the description below.

Thus, various improvements may be made to the SES protocol in accordance with one or more aspects of the invention. Client pairing with an unintended AP can be prevented in various ways. First, if the client finds more than one AP, the client can abort the pairing procedure and warn the user. Second, the access points can be shipped with predefined names (such as "Tiger" and "Lion") that are drawn from a relatively large pool of names, and these names may be printed on top of the AP. If the client finds more than one AP, the user may then be asked to select the correct AP from a list of names. This feature can help reduce accidents. If there is more than one AP with the same name, then the client may be adapted to abort the pairing procedure.

A client also can pair with an unintended AP if the user presses the button on the client device after the predetermined amount of time (e.g., two minutes) from the button pressing on the AP_OK device such that the AP_OK device is no longer in reception mode. This situation could be prevented, for example, if the AP gives some indication (such as flashing light) when it is in reception mode and a different kind of indication (such as constant light for five seconds) when the pairing has been successfully established. In this way, the user could verify after pressing the button on client that the indication on AP has changed from the reception mode to the successfully paired mode. Also, the client user can see, prior to pressing the client button, whether the AP is in receiving mode. If a successful pairing does not happen, but rather the client has paired with AP_OTHER, then the incorrect pairing may be removed from the client manually.

An AP pairing with an unintended client can be prevented as well. For example, an AP can pair with a CLIENT_OTHER if the user of CLIENT_OTHER presses the button on his/her client device faster than the user of CLIENT_OK device presses his/her button. In this case, a warning message may be sent to CLIENT_OK. This situation may be detected and handled in a variety of different ways. For example, the situation may be detected if there is a pairing protocol between the CLIENT and the AP and the AP continues to listen to client requests for some time even after a first client successfully completes a pairing, e.g., until the AP pairing time interval (e.g., 2 minutes in this example system and method) runs out. If CLIENT_OTHER pairs first, then when CLIENT_OK tries to pair with AP_OK, AP_OK will return a warning message to CLIENT_OK indicating that pairing is no longer possible and the reason for it (e.g., that another device has already paired). On receiving the warning message, CLIENT_OK may be adapted to display a message to the user saying something like "AP refused to admit your device because another device got there before you. Hold down the cancel key on the AP for 3 seconds to kick the other device out of your AP's network," or other appropriate message based on the system design.

When CLIENT_OTHER arrives before CLIENT_OK, the AP might not recognize CLIENT_OK and/or it might not recognize that a wrong user (CLIENT_OTHER) has been paired (the AP might not have any way of recognizing these situations). For this reason, the AP might not be adapted to take any action automatically, on its own, but rather, the AP sends a warning message at least to the client device attempting the later pairing. If CLIENT_OK receives the warning message, then the user of CLIENT_OK can perform the REMOVE_LAST_OPERATION described below and/or take other appropriate action. If CLIENT_OTHER receives the warning, then, by definition, its user cannot act on the warning because that user presumably will not have physical access to do the REMOVE_LAST_OPERATION function on the AP (e.g., the unauthorized client user presumably will not have physical access to the AP).

A REMOVE_LAST_OPERATION function associated with the AP may be performed at any desired time, for example, when the user receives a warning message at CLIENT_OK as described above. Performing this operation erases, terminates, or otherwise eliminates the unintended pairing established with CLIENT_OTHER, and optionally, again makes the AP available for pairing with CLIENT_OK. The REMOVE_LAST_OPERATION function may be activated, for example, by pressing the same SES button longer or shorter than in a normal pairing, or, if desired, another button may be provided for this operation.

Man-in-the-middle attacks may be prevented by allowing the user to compare the hashes of the agreed pairwise WPA key. For example, if both the client and the AP have a single LED, the devices could present the hash of the AP's public key one bit a time with the LED (1-bit could be presented with a green light and 0-bit with no light, for example), to thus ensure that the client has paired with AP_OK. If both devices have small displays, the hash could be presented one byte at a time as hexadecimal characters. If both devices have audio output, the hash could be represented as a sound sequence (using different frequencies or different amplitudes to represent 1 and 0). The AP may broadcast a list of its hash outputting capabilities, and the client is assumed to choose one from the list.

This comparing process is optional. If the user does nothing after the normal SES protocol, no comparison of hashes would be performed. However, if the user wants to compare hashes, she can perform a COMPARE_HASHES_OPERATION after the normal SES protocol. If users do not use the COMPARE_HASHES_OPERATION, the same level of security as in the original SES may be provided and achieved. The COMPARE_HASHES_OPERATION, however, allows a security-conscious user to achieve a higher level of security against an active man-in-the-middle.

Once the user has performed a COMPARE_HASHES_OPERATION, both of the devices show the first part of the hash. If the hash parts are different, a man-in-the-middle attack has occurred and the user may be prompted or otherwise know to perform the REMOVE_LAST_OPERATION on the AP. If the hash parts are identical, the user can either do nothing and this pairing will be accepted. Alternatively, the user can select NEXT_PART_OPERATION on both of the devices. As a result of this operation, both of the devices show the next part of the hash and the user can again choose either to remove this pairing, accept this pairing by doing nothing, or move on to the next hash part. Comparing hashes using audio output may be one desirable user-friendly approach because the human ear can more easily differentiate between sound sequences that are out of key or out of phase.

The more the user continues with this hash comparing process, the smaller the possibility of a successful man-in-the-middle attack. Comparing one bit reduces the possibility of successful attack by 50 percent. Comparing two bits reduces the possibility by 75 percent, and so on. The pairing protocol can be based, for example, on MANA ("Manual Authentication for Wireless Devices", Gehrmann et al, Cryptobytes Spring 2004), which allows a high level of security against man-in-the-middle attacks even with relatively short check values.

According to an aspect of the invention, the SES protocol may be modified to provide for temporary access. The basic SES protocol only allows users to add devices permanently into the wireless network. However, it would be an improvement to also allow temporary access, e.g., for visitors, hotel guests, etc. When a visitor arrives, the user can give her temporary access to the network, for example, by performing an ADD_VISITOR_OPERATION on the AP instead of pressing the normal SES button. This action starts the normal SES protocol execution and the visitor is required to press the button on her device within the predetermined amount of time, e.g., two minutes. If the SES negotiation is successful, the AP will remember this client as a visitor. Examples of ways that temporary access may be provided are described above.

Temporary access may be revoked is various ways. When the user wants remove all the visitors from the network, she can perform a REMOVE_VISITORS_OPERATION on the AP. As a result of this operation, the AP will send a new WPA key to all other clients belonging to the network, and visitors will not receive this new key. Removal of less than all visitors may be accomplished as described above.

According to an aspect of the invention, different operations may be mapped to actual actions performed by the user. Those of skill in the art will appreciate that these are examples only, and other mappings may also or alternatively be used. Any way of mapping a user action to AP or client device functions may be used without departing from the scope of the invention. Notably, the various buttons described below (e.g., the "SES" and "Visitor" buttons) may be located directly on the AP and/or on another control device operatively coupled to the AP (e.g., by a wireless connection, a remote controller, etc.), for use, for example, in the event that the AP is located in a remote or hard to reach location. Table 3 below shows examples of possible mappings of device operations to various user actions.

TABLE 3

Mappings from operations to actions

| Operation | Actions |
| --- | --- |
| REMOVE_LAST_OPERATION | Press SES button for three seconds after pairing |
| COMPARE_HASHES_OPERATION | Press SES button shortly after pairing |
| NEXT_PART_OPERATION | Press SES button shortly when current hash part is being shown |
| ADD_VISITOR_OPERATION | Press another button (labeled as Visitor Button) shortly |
| REMOVE_VISITORS_OPERATION | Press another button (labeled as Visitor Button) for three seconds |

The basic SES protocol is attractive because it is user-friendly and relatively secure. However, it still has drawbacks. Aspects of this invention provide various extensions to the basic SES protocol that make the protocol more secure and useful, without sacrificing the usability advantage of SES. It should be noted that these extensions do not complicate the normal SES protocol from the point of view of the user. The user can eliminate accidental unintended pairings with the simple REMOVE_LAST_OPERATION, but she is not forced to do so.

Preventing active man-in-the-middle attacks is considerably more difficult and in many scenarios active man-in-the-middle attacks are not realistic. In security critical situations an advanced user could, however, use the hash comparing method described above to improve the security of the normal SES protocol.

The ADD_VISITOR_OPERATION and REMOVE_VISITORS_OPERATION provide useful extensions to the SES protocol. Without these the user cannot add visitor devices and/or she has re-configure the entire network once the user leaves the network.

One or more aspects of the invention may be embodied in computer-executable instructions, such as in one or more program modules, executed by one or mote computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method, comprising:
   executing, by an access controller, a key agreement protocol with a terminal device via a first communication channel to generate a first key corresponding to the terminal device, wherein said key agreement protocol is authenticated using a second key, wherein the second key is sent to the terminal device from a trusted device on a wireless network via a second communication channel prior to execution of the key agreement protocol, wherein the second key is generated based on a function of a third key and at least one other variable, and wherein the terminal device, the trusted device and the access controller are separate devices;
   storing, by the access controller, an entry corresponding to the terminal device in an access database of the wireless network, wherein the entry stores the first key, the second key and the third key in association with one another, and wherein the third key is specific to a type of device;
   authenticating, by the access controller, the terminal device using the first key, said authenticating comprising querying the access database for the entry corresponding to the terminal device to determine authentication and access rights of the terminal device;
   authorizing the terminal device to access the wireless network using the first communication channel upon successful authentication; and
   upon determining that access authorization of the terminal device is to be revoked, revoking the terminal device's authorization to access the wireless network by deactivating the first key and modifying the second key.

2. The method of claim 1, wherein the at least one other variable comprises one of a timestamp, a sequence number, a device name, a device type, a device category, a device address, and a device entry lifetime.

3. The method of claim 1, wherein the first key comprises a pre-shared key (PSK), the second key comprises an authentication key (AK), and the third key comprises an original authentication key (OAK).

4. The method of claim 1, wherein executing the key agreement protocol comprises transferring the at least one other variable as part of the key agreement protocol.

5. The method of claim 1, further comprising determining the third key via a key agreement protocol between the trusted device and the wireless network.

6. The method of claim 5, further comprising the trusted device determining the third key and transmitting the third key to the wireless network.

7. The method of claim 5, further comprising the wireless network determining the third key and transmitting the third key to the trusted device.

8. The method of claim 5, further comprising receiving the third key from a third party.

9. The method of claim 1, wherein the entry comprises information received from the terminal device.

10. The method of claim 1, wherein the first key is generated based on a timestamp.

11. The method of claim 10, wherein revoking the terminal device's access authorization comprises revoking the terminal device's authorization to access the wireless network without revoking a second terminal device's access to the wireless network.

12. The method of claim 10, wherein revoking comprises revoking all access database entries matching one or more specified criteria.

13. The method of claim 12, wherein the one or more specified criteria comprises a predefined device group type.

14. The method of claim 13, wherein the predefined device group type identifies a device group corresponding to guest devices to the wireless network.

15. The method of claim 12, wherein the one or more specified criteria comprises a device name.

16. The method of claim 1, wherein the second communication channel comprises a near field communication (NFC) channel.

17. The method of claim 1, wherein the second communication channel comprises a telecommunications messaging service.

18. The method of claim 1, wherein the first communication channel comprises a wireless local area network (WLAN).

19. The method of claim 1, wherein the wireless network comprises a wireless local area network (WLAN).

20. The method of claim 1, wherein the terminal device accesses the wireless network through the access controller.

21. The method of claim 1, further comprising storing the access database in the access controller.

22. The method of claim 1, wherein the trusted device comprises a wireless communications device.

23. A method, comprising:
   a terminal device receiving a first key from a trusted device of a wireless network via a first communication channel wherein the first key is generated based on a function of a second key and at least one variable unique to the terminal device;
   sending a request for a key agreement protocol to an access controller of the wireless network via a second communication channel, wherein the access controller, the trusted device and the terminal device are physically different from each other;
   executing a key agreement protocol to generate a third key corresponding to the wireless network via the second communication channel, wherein said key agreement protocol is authenticated using the first key, and wherein the first key, the second key and the third key are configured to be stored in association with one another, and wherein the second key is specific to a type of device;

transmitting a request for joining the wireless network wherein the request comprises authentication information based on the third key; and receiving confirmation for the joining request based on the trusted device querying an access database for an entry corresponding to the terminal device to determine authentication and access rights of the terminal device.

24. One or more non-transitory computer readable media storing computer executable instructions that, when executed, cause an apparatus to:

receive a first key from a trusted device of a wireless network via a first communication channel, wherein the first key is generated based on a function of a second key and at least one variable unique to the apparatus;

send a request for a key agreement protocol to an access controller of the wireless network, wherein the access controller, the trusted device and the apparatus are physically different from each other;

execute the key agreement protocol to generate a third key corresponding to the wireless network via the second communication channel, wherein said key agreement protocol is authenticated using the first key, and wherein the first key, the second key and the third key are configured to be stored in association with one another, and wherein the second key is specific to a type of device;

transmit a request for joining the wireless network wherein the request comprises authentication information based on the third key; and receive confirmation for the joining request based on the trusted device querying an access database for an entry corresponding to the apparatus to determine authentication and access rights of the terminal device.

25. One or more non-transitory computer readable media storing computer executable instructions that, when executed, cause an apparatus to:

execute a key agreement protocol to generate a first key corresponding to a terminal device via a first communication channel, wherein said key agreement protocol is authenticated using the second key, wherein the second key is sent to the terminal device from a trusted device on a wireless network via a second communication channel and wherein the terminal device, wherein the second key is generated based on a function of a third key and at least one other variable, and wherein the trusted device and the apparatus are physically different devices;

store an entry corresponding to the terminal device in an access database of a wireless network, wherein the entry stores the first key, the second key and the third key in association with one another, and wherein the third key is specific to a type of device;

authenticate the terminal device using the second key, said authenticating comprising querying the access database for the entry corresponding to the terminal device to determine authentication and access rights of the terminal device;

authorize the terminal device to access the wireless network using the second communication channel upon successful authentication; and upon determining that an authorization to access the wireless network by the terminal is to be revoked, revoking the terminal device's authorization to access the wireless network by deactivating the first key and modifying the second key.

26. The computer readable media of claim 25, wherein the at least one other variable comprises one of a timestamp, a sequence number, a device name, a device type, a device category, a device address, and a device entry lifetime.

27. The computer readable media of claim 25, wherein the first key comprises a pre-shared key (PSK), the second key comprises an authentication key (AK), and the third key comprises an original authentication key (OAK).

28. The computer readable media of claim 25, wherein executing the key agreement protocol comprises transferring the at least one other variable as part of the key agreement protocol.

29. The computer readable media of claim 25, said instructions further comprising determining the third key via a key agreement protocol between the trusted device and the wireless network.

30. The computer readable media readable media of claim 29, said instructions further comprising the trusted device determining the third key and transmitting the third key to the wireless network.

31. The computer readable media of claim 29, said instructions further comprising the wireless network determining the third key and transmitting the third key to the trusted device.

32. The computer readable media of claim 29, said instructions further comprising receiving the third key from a third party.

33. The computer readable media of claim 25, wherein the entry comprises information received from the terminal device.

34. The computer readable media readable media of claim 25, wherein revoking the terminal device's access to the wireless network is performed based on information stored in the entry in the access database.

35. The computer readable media of claim 34, wherein revoking comprises revoking the terminal device's access to the wireless network without revoking a second terminal device's access to the wireless network.

36. The computer readable media of claim 34, wherein revoking comprises revoking all access database entries matching one or more specified criteria.

37. The computer readable media of claim 36, wherein the one or more specified criteria comprises a predefined device group type.

38. The computer readable media of claim 37, wherein the predefined device group type identifies a device group corresponding to guest devices to the wireless network.

39. The computer readable media of claim 36, wherein the one or more specified criteria comprises a device name.

40. The computer readable media of claim 25, wherein the first communication channel comprises a near field communication (NFC) channel.

41. The computer readable media of claim 25, wherein the first communication channel comprises a telecommunications messaging service.

42. The computer readable media of claim 25, wherein the second communication channel comprises a wireless local area network (WLAN).

43. The computer readable media of claim 25, wherein the wireless network comprises a wireless local area network (WLAN).

44. The computer readable media of claim 25, said instructions further comprising the terminal device accessing the wireless network through an access controller.

45. The computer readable media of claim 44, further comprising storing the access database in the access controller.

46. The computer readable media of claim 25, wherein the trusted device comprises a wireless communications device.

47. An apparatus comprising:
a least one processor; and
memory operatively coupled to the at least one processor and storing computer readable instructions that, when executed, cause the apparatus to:
- execute a key agreement protocol to generate a first key corresponding to a terminal device via a first communication channel, wherein said key agreement protocol is authenticated using a second key, wherein the second key is sent to the terminal device from a trusted device on a wireless network via a second communication channel prior to execution of the key agreement protocol and wherein the terminal device, wherein the second key is generated based on a function of a third key and at least one other variable, wherein the trusted device and the apparatus are physically different from each other;
- store an entry corresponding to the terminal device in an access database of the wireless network, wherein the entry stores the first key, the second key and the third key in association with one another, and wherein the third key is specific to a type of device;
- authenticate the terminal device using the second key, said authenticating comprising querying the access database for the entry corresponding to the terminal device to determine authentication and access rights of the terminal device;
- authorize the terminal device to access the wireless network using the second communication channel upon successful authentication; and
- upon determining that an authorization to access the wireless network by the terminal is to be revoked, revoking the terminal device's authorization to access the wireless network by deactivating the first key and modifying the second key.

48. An apparatus comprising:
a least one processor; and
memory operatively coupled to the at least one processor and storing computer readable instructions that, when executed, cause the apparatus to:
- receive a first key from a trusted device of a wireless network via a first communication channel wherein the first key is generated based on a function of a second key and at least one variable unique to the apparatus;
- send a request for a key agreement protocol to an access controller of the wireless network, wherein the access controller, the trusted device and the apparatus are physically different from each other;
- execute the key agreement protocol to generate a third key corresponding to the wireless network via a second communication channel, wherein said key agreement protocol is authenticated using the first key, and wherein the first key, the second key and the third key are configured to be stored in association with one another, and wherein the second key is specific to a type of device;
- transmit a request for joining the wireless network wherein the request comprises authentication information based on the third key; and
- receive confirmation for the joining request based on the trusted device querying an access database for an entry corresponding to the apparatus to determine authentication and access rights of the terminal device.

* * * * *

UNITED STATES PATENT AND TRADEMARK OFFICE
CERTIFICATE OF CORRECTION

PATENT NO.        : 8,532,304 B2                                    Page 1 of 1
APPLICATION NO.   : 11/169328
DATED             : September 10, 2013
INVENTOR(S)       : Nadarajah Asokan et al.

It is certified that error appears in the above-identified patent and that said Letters Patent is hereby corrected as shown below:

In the Claims

In Column 20, Claim 34, Line 29:
    Delete "readable media".

Signed and Sealed this
First Day of April, 2014

Michelle K. Lee
*Deputy Director of the United States Patent and Trademark Office*